(12) United States Patent
Bennett et al.

(10) Patent No.: US 9,207,397 B2
(45) Date of Patent: Dec. 8, 2015

(54) LIGHT DIFFUSING FIBER WITH LOW MELTING TEMPERATURE GLASS

(71) Applicant: CORNING INCORPORATED, Corning, NY (US)

(72) Inventors: Kevin Wallace Bennett, Hammondsport, NY (US); Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/159,637

(22) Filed: Jan. 21, 2014

(65) Prior Publication Data

US 2015/0131955 A1 May 14, 2015

Related U.S. Application Data

(60) Provisional application No. 61/904,151, filed on Nov. 14, 2013.

(51) Int. Cl.
*G02B 6/02* (2006.01)
*G02B 6/036* (2006.01)
(Continued)

(52) U.S. Cl.
CPC ............ *G02B 6/03633* (2013.01); *G02B 6/001* (2013.01); *G02B 6/03694* (2013.01); *G02B 6/04* (2013.01)

(58) Field of Classification Search
CPC ...... G02B 6/001; G02B 6/04; G02B 6/03633; G02B 6/03694
See application file for complete search history.

(56) References Cited

U.S. PATENT DOCUMENTS

| 4,089,586 A | 5/1978 | French et al. |
| 4,422,719 A | 12/1983 | Orcutt |
| 4,452,508 A * | 6/1984 | Beales et al. .................. 385/124 |

(Continued)

FOREIGN PATENT DOCUMENTS

| GB | 1015057 | 12/1965 |
| WO | 0000859 | 1/2000 |

(Continued)

OTHER PUBLICATIONS

An et al., "Viewing structural inhomogeneities at the core-cladding interface of re-heated MCVD optical fiber preforms with optical microscopy," Optics Express, Dec. 13, 2004, pp. 6153-6158, vol. 12, No. 25., Optical Society of America.

(Continued)

*Primary Examiner* — Omar R Rojas
(74) *Attorney, Agent, or Firm* — Svetlana Z. Short

(57) ABSTRACT

A light-diffusing optical fiber that includes a core region in the fiber that comprises a core glass composition; and an inner cladding in the fiber that surrounds the core region and comprises a cladding glass composition that substantially differs from the core glass composition. The core glass composition comprises a doped, low-melting point silica glass having less than 90% by weight $SiO_2$, and the numerical aperture of the fiber is greater than or equal to 0.4. Further, light-diffusing optical fiber bundles that include a jacket comprising a scattering element; and a plurality of the light-diffusing optical fibers arranged within the jacket. Also, light-diffusing optical fiber bundles that include a transparent jacket; and a plurality of the light-diffusing optical fibers arranged within the jacket, the fibers further configured with an outer cladding having a plurality of scattering elements.

18 Claims, 4 Drawing Sheets

(51) Int. Cl.
*F21V 8/00* (2006.01)
*G02B 6/04* (2006.01)

(56) References Cited

U.S. PATENT DOCUMENTS

| | | |
|---|---|---|
| 4,466,697 A | 8/1984 | Daniel |
| 5,059,230 A | 10/1991 | Mollenauer et al. |
| 5,609,665 A | 3/1997 | Bruce et al. |
| 6,169,836 B1 | 1/2001 | Sugiyama et al. |
| 6,234,656 B1 | 5/2001 | Hosseini et al. |
| 6,714,711 B1 | 3/2004 | Lieberman et al. |
| 6,999,662 B2 | 2/2006 | Duguay et al. |
| 7,169,470 B2 * | 1/2007 | Wolff et al. ............. 428/375 |
| 7,526,160 B1 | 4/2009 | Homa et al. |
| 2011/0103757 A1 | 5/2011 | Alkemper et al. |
| 2011/0122646 A1 * | 5/2011 | Bickham et al. .......... 362/554 |
| 2012/0275180 A1 * | 11/2012 | Button et al. ............. 362/558 |
| 2013/0259436 A1 | 10/2013 | Tanabe et al. |

FOREIGN PATENT DOCUMENTS

| | | |
|---|---|---|
| WO | 2009042347 A1 | 4/2009 |
| WO | 2011063214 | 5/2011 |

OTHER PUBLICATIONS

Tsujikawa et al., "Intrinsic loss of optical fibers," Optical Fiber Technology, May 26, 2005, pp. 319-331, Elsevier Inc.

* cited by examiner

LIGHT DIFFUSING FIBER WITH LOW MELTING TEMPERATURE GLASS

CROSS-REFERENCE TO RELATED APPLICATION

This application claims the benefit under 35 USC §119(e) of provisional application Ser. No. 61/904,151, filed Nov. 14, 2013, entitled LIGHT DIFFUSING FIBER WITH LOW MELTING TEMPERATURE GLASS, the entire contents of which are incorporated by reference.

BACKGROUND

The present invention generally relates to light-diffusing optical fibers with scattering influenced by Rayleigh, dopant concentration and/or small angle scattering effects, for various applications including decorative lighting, automotive lighting, appliance lighting, water treatment and purification, and other special lighting applications.

Optical fiber configurations have been proposed that allow for the propagation of light radially outwards along the length of the fiber to create a fairly uniform distribution of light illumination along the length of the fiber. Such light-diffusing fibers ("LDF") can be particularly useful for a number of applications, e.g., decorative exterior lighting for a residence, decorative vehicle lighting, and interior lighting for appliances.

Current LDF technologies are generally limited to fibers having a core region comprising a fused $SiO_2$ composition containing various sized defects configured for the purpose of scattering light. The processes used to introduce these defects and the processing associated with the fused $SiO_2$ glass composition itself are relatively expensive. Further, sufficient numerical aperture levels in these fibers require the use of low index polymeric cladding material, another potentially expensive process. Accordingly, there is a need for LDFs with configurations and compositions that can be more easily and cost effectively tailored to particular light scattering applications.

SUMMARY

According to one embodiment, a light-diffusing optical fiber includes a core region in the fiber that comprises a core glass composition; and an inner cladding in the fiber that surrounds the core region and comprises a cladding glass composition that substantially differs from the core glass composition. The core glass composition comprises a doped, low-melting point silica glass having less than 90% by weight $SiO_2$, and the numerical aperture of the fiber is greater than or equal to 0.4.

In some embodiments, the light-diffusing optical fiber further includes an outer cladding that surrounds the inner cladding and comprises a polymer composition. The outer cladding may further comprise an inner layer and an outer scattering layer doped with scattering particles. The outer cladding may also comprise a scattering layer doped with scattering particles.

According to another embodiment, a light-diffusing optical fiber bundle includes a jacket comprising a scattering element; and a plurality of optical fibers arranged within the jacket. Each optical fiber includes: a core region that comprises a core glass composition and an inner cladding that surrounds the core region and comprises a cladding glass composition that substantially differs from the core glass composition. The core glass composition of each optical fiber comprises a doped, low-melting point silica glass having less than 90% by weight $SiO_2$, and the numerical aperture of the fiber is greater than or equal to 0.4.

In some embodiments, the light-diffusing optical fiber bundle is configured such that the scattering element is a scattering filler arranged between the plurality of optical fibers within the jacket. The scattering filler may be doped with $TiO_2$ particles or other scattering particles. In other embodiments, the light-diffusing optical fiber bundle is configured such that the scattering element is a scattering layer arranged within an outermost portion of the jacket. The scattering layer may be doped with scattering particles.

According to a further embodiment, a light-diffusing optical fiber bundle includes a transparent jacket; and a plurality of optical fibers arranged within the jacket. Each optical fiber includes: a core region that comprises a core glass composition, an inner cladding that surrounds the core region and comprises a cladding glass composition that substantially differs from the core glass composition, and an outer cladding in the fiber that surrounds the inner cladding and comprises a polymer composition and a plurality of scattering elements. The core glass composition of each optical fiber comprises a doped, low-melting point silica glass having less than 90% by weight $SiO_2$, and the numerical aperture of the fiber is greater than or equal to 0.4.

In some embodiments, the light-diffusing optical fiber bundle is configured such that the plurality of scattering elements in each optical fiber is a plurality of $TiO_2$ particles or other scattering particles, and the outer cladding further comprises an inner layer and an outer scattering layer containing the plurality of scattering elements. In other embodiments, the light-diffusing optical fiber bundle is configured such that the plurality of scattering elements in each optical fiber is a plurality of scattering particles.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1A:
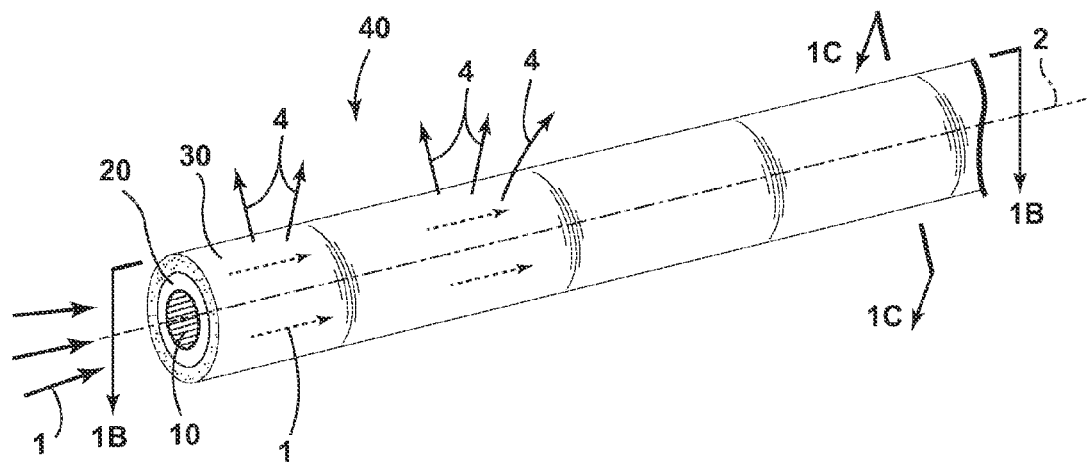
FIG. 1A is a schematic perspective view of an exemplary embodiment of a light-diffusing optical fiber.

Reference will now be made in detail to the present preferred embodiments, examples of which are illustrated in the accompanying drawings. Whenever possible, the same reference numerals will be used throughout the drawings to refer to the same or like parts. It should be understood that the embodiments disclosed herein are merely examples, each incorporating certain benefits of the present invention.

Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

Terms such as "horizontal," "vertical," "front," "back," etc., and the use of Cartesian Coordinates are for the sake of reference in the drawings and for ease of description and are not intended to be strictly limiting either in the description or in the claims as to an absolute orientation and/or direction.

In the description of the invention below, the following terms and phrases are used in connection to light-diffusing fibers.

The "refractive index profile" is the relationship between the refractive index or the relative refractive index and the waveguide (fiber) radius.

The "relative refractive index percent" is defined as:

$$\Delta(r)\% = 100 \times [n(r)^2 - (n_{REF})^2]/2n(r)^2,$$

where n(r) is the refractive index at radius, r, unless otherwise specified. The relative refractive index percent $\Delta(r)\%$ is defined at 850 nm unless otherwise specified. In one aspect, the reference index $n_{REF}$ is silica glass with the refractive index of 1.452498 at 850 nm. In another aspect, $n_{REF}$ is the maximum refractive index of the cladding glass at 850 nm. As used herein, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

An "up-dopant" is herein considered to be a dopant which has a propensity to raise the refractive index of a region of a light-diffusing optical fiber relative to pure undoped $SiO_2$. A "down-dopant" is herein considered to be a dopant which has a propensity to lower the refractive index of a region of the fiber relative to pure undoped $SiO_2$. An up-dopant may be present in a region of a light-diffusing optical fiber having a negative relative refractive index when accompanied by one or more other dopants which are not up-dopants. Likewise, one or more other dopants which are not up-dopants may be present in a region of a light-diffusing optical fiber having a positive relative refractive index. A down-dopant may be present in a region of a light-diffusing optical fiber having a positive relative refractive index when accompanied by one or more other dopants which are not down-dopants.

Likewise, one or more other dopants which are not down-dopants may be present in a region of a light-diffusing optical fiber having a negative relative refractive-index.

The "numerical aperture" ("NA") of a light-diffusing optical fiber is defined as:

$$NA = \sqrt{n_{core}^2 - n_{clad}^2},$$

where NA is the numerical aperture of the fiber, $n_{core}$ is the refractive index of the core region of the fiber and $n_{clad}$ is the refractive index of the cladding region of the fiber.

Referring to FIGS. 1A-1D, one embodiment of a light-diffusing optical fiber 40 is depicted. The light-diffusing optical fiber 40 generally comprises a core region 10 with a refractive index, $n_1$, and relative refractive index $\Delta_1$. The core region 10 comprises a glass composition classified as a doped, low-melting point silica glass having less than 90% by weight $SiO_2$. The core region 10 may have a radius, $R_1$, from 10 μm to about 600 μm, centered about an axis 2. Preferably, $R_1$ is from 50 μm to about 600 μm. In other embodiments, $R_1$ is about 50 μm, 60 μm, 70 μm, 80 μm, 90 μm, 100 μm, 120 μm, 140 μm, 160 μm, 180 μm, 200 μm, 220 μm, 240 μm or 250 μm.

Preferably, the glass composition of the core region 10 is characterized as a soda-lime silicate glass, alkali borosilicate glass or an aluminosilicate glass. The soda-lime silicate glass can comprise varying levels of $Na_2O$, $CaO$ and $SiO_2$. For example, a suitable soda-lime silicate glass composition is: $72SiO_2$-$17Na_2O$-$4CaO$-$5LiO_2$-$2MgO$ given in weight percent. The alkali borosilicate glass can comprise varying levels of $SiO_2$, $B_2O_3$ and an alkali, e.g., $Na_2O$. For example, a suitable alkali borosilicate glass composition is: $75SiO_2$-$10B_2O_3$-$25Na_2O$ given in weight percent. The aluminosilicate glass can comprise varying levels of $SiO_2$ and $Al_2O_3$. An alkali, e.g., $Na_2O$, may also be included in the aluminosilicate glass composition. For example, suitable aluminosilicate glass compositions include: $50.0$-$75.0SiO_2$-$0.0$-$20.0B_2O_3$-$0.0$-$15.0Al_2O_3$-$0.0$-$1.5Li_2O$-$3.0$-$11.0Na_2O$ given in weight percent.

As noted earlier, the core region 10 of light-diffusing fiber 40 is a doped, low-melting point silica glass. Doping levels in the core region 10 should be sufficient to increase the refractive index of the core region 10 such that the numerical aperture, NA, of the light-diffusing optical fiber 40 is greater than or equal to 0.4. Preferably, the dopants used to dope the core region 10 are up-dopants that can raise the refractive index, $n_1$, of the core region 10. Suitable dopants for the core region 10 include: $TiO_2$, $P_2O_5$, $GeO_2$, $ZnO$, $MgO$, La, Er, Tm, Pb, Ti, Al and Nd. Combinations of these dopants are also feasible in the core region 10. For example, the core region 10 can be doped with up to 10 mol % $TiO_2$, up to 15 mol % $Al_2O_3$, up to 20 mol % $GeO_2$ and/or up to 25 mol % $P_2O_5$. Preferably, the doping levels employed in the core region 10 of light-diffusing optical fiber 40 exceed the doping levels in the core region of optical fibers typically employed in the telecommunications industry. It is also preferable to introduce the dopant(s) into the core region 10 in a gaseous or melt form during the processes employed to fabricate light-diffusing optical fiber 40. This ensures that the dopants are homogenously distributed within the core region 10 at an elemental or molecular scale.

Still referring to FIGS. 1A-1D, the light-diffusing optical fiber 40 comprises an inner cladding 20 that surrounds the core region 10. The inner cladding 20 comprises a glass composition that substantially differs from the glass composition of the core region 10. The inner cladding 20 possesses a refractive index, $n_2$, and an outer radius $R_2$. Preferably, the composition of inner cladding 20 is selected such that $n_2 < n_1$ (see FIG. 1D). It is also a preference to select the composition of inner cladding 20 in view of the composition of core region 10 to ensure that NA is greater than or equal to 0.4. It is also preferable to employ an undoped glass composition for inner cladding 20 of the light-diffusing optical fiber 40. In some embodiments, inner cladding 20 can comprise a silica glass that is down-doped with a down-dopant, e.g., fluorine. In other embodiments, the inner cladding 20 is comprised of a glass with a relative refractive index ($\Delta_2$) that is negative when $n_{REF}$ is given by the refractive index of pure silica glass. For example, the relative refractive index of the inner cladding 20, $\Delta_2$, may be less than about −0.5% and in some embodiments less than −1%.

Figure 1B:
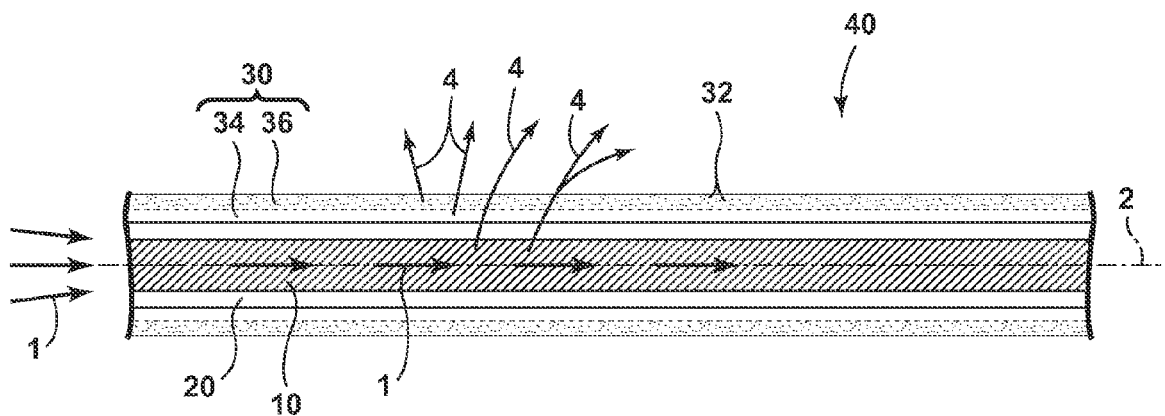
FIG. 1B is a lengthwise, cross-sectional view of the light-diffusing optical fiber depicted in FIG. 1A as viewed along the direction 1B-1B.
Figure 1C:
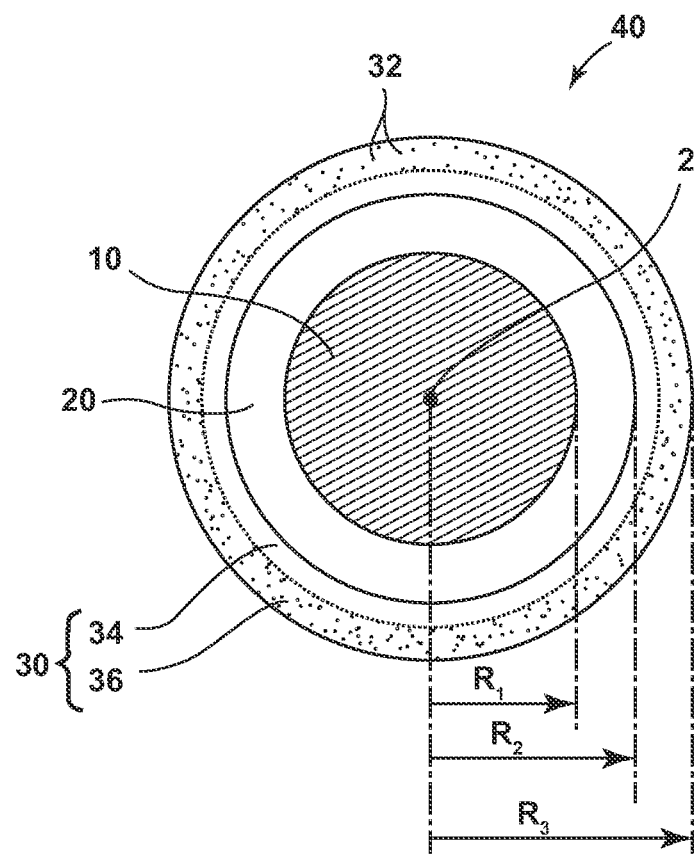
FIG. 1C is a cross-sectional view of the light-diffusing optical fiber depicted in FIG. 1A as viewed along the direction 1C-1C.
Figure 1D:
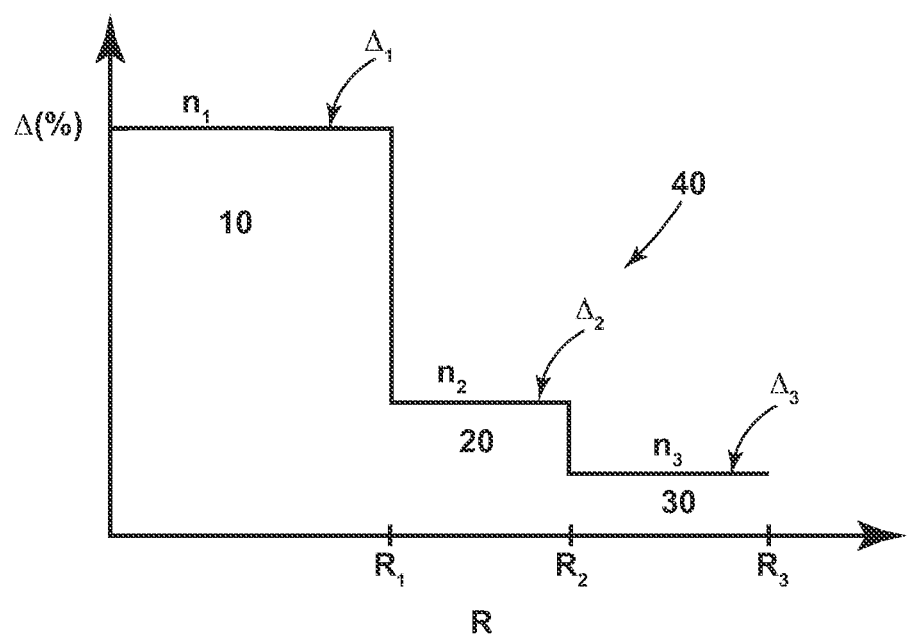
FIG. 1D is a schematic illustration of a plot of relative refractive index versus fiber radius for the light-diffusing optical fiber depicted in FIG. 1A.

In general, the inner cladding 20 of light-diffusing optical fiber 40 generally extends from the outer radius, $R_1$, of the core region 10 to an outer radius, $R_2$ (see FIG. 1C). In some embodiments, the thickness of the inner cladding 20 (i.e., thickness=$R_2-R_1$) is greater than about 10 µm, greater than about 20 µm, greater than about 50 µm or greater than about 70 µm. In some embodiments, the inner cladding 20 has a thickness of about 10 µm, 20 µm, 30 µm, 40 µm, 50 µm, 60 µm, 70 µm, 80 µm, 90 µm, or 100 µm.

Referring to FIGS. 1A-1D, the light-diffusing optical fiber 40 can further comprise an outer cladding 30 that surrounds the inner cladding 20. The outer cladding 30 has a refractive index $n_3$ a relative refractive index $\Delta_3$, and can comprise a clear layer of secondary coating material, e.g., a fluorinated or a non-fluorinated polymer composition, typical of telecommunications optical fibers for mechanical handling purposes. Typically, the refractive index of the outer cladding 30 can be lower or higher than the refractive indices of the inner cladding 20 and the core region 10 (see FIG. 1D). As shown in FIG. 1C, outer cladding 30 has a radius, $R_3$, as defined from the fiber axis 2.

As depicted in FIGS. 1B and 1C, the outer cladding 30 can comprise an inner layer 34 and an outer scattering layer 36, with the outer scattering layer 36 surrounding the inner layer 34. The outer scattering layer 36 of outer cladding 30 can be doped with light scattering agents 32, such as $TiO_2$ particles and/or other scattering particles. In other embodiments (not shown), the outer cladding 30 can comprise an outer scattering layer 36 with no inner layer 34. In some of these embodiments, outer scattering layer 36 can be doped with light scattering agents 32, such as $TiO_2$ particles. Outer scattering layer 36 can be prepared according to the configurations and methods found in, for example, U.S. application Ser. No. 13/713,224, herein incorporated by reference.

Referring again to FIGS. 1B and 1C, the outer cladding 30 surrounds and is generally in contact with the inner cladding 20. Preferably, the outer cladding 30, and its sublayers—inner layer 34 and outer scattering layer 36, comprise a polymeric coating. The polymeric coating may comprise any liquid polymer or prepolymer material into which the scattering agents 32 could be added and in which the blend may be applied to the light-diffusing optical fiber 40 as a liquid and then converted to a solid after application to the fiber 40. In some embodiments, the outer cladding 30 comprises a polymer coating such as an acrylate-based polymer, e.g., CPC6, manufactured by DSM Desotech, Elgin, Ill., or a silicone-based polymer further comprising a plurality of scattering agents 32. In another embodiment, the outer cladding 30 comprises a low refractive index polymeric material such as UV— or thermally-curable fluoroacrylate, such as PC452 available from SSCP Co. Ltd. 403-2, Moknae, Ansan, Kyunggi, Korea. In some embodiments, it was most efficient to blend the scattering agents 32 into standard UV-curable acrylate-based optical fiber coatings, such as Corning Inc.'s standard CPC6 secondary optical fiber coating. To make the blends of scattering agents 32, a concentrate was first made by mixing 30% by weight of the scattering agent into DSM 950-111 secondary CPC6 optical fiber coating and then passing the mix over a three-roll mill. These concentrates were then either applied directly as coatings or were further diluted with DSM 950-111 to give the desired scattering effect in light-diffusing optical fiber 40.

In some other embodiments, the outer cladding 30 can be utilized to enhance the uniformity of the angular distribution and/or the nature of the light that is emitted radially from the core region 10 and out of the light-diffusing optical fiber 40 through the inner cladding 20. The scattering agents 32 incorporated into the outer cladding 30, and particularly outer scattering layer 36, may comprise nano- or micro-particles with an average diameter of from about 200 nm to about 10 µm. In some embodiments, the average diameter of the particles employed as scattering agents 32 is about 200 nm, 300 nm, 400 nm, 500 nm, 600 nm, 700 nm, 800 nm, 900 nm, 1 µm, 2 µm, 3 µm, 4 µm, 5 µm, 6 µm, 7 µm, 8 µm, 9 µm, or 10 µm. The concentration of the scattering agents 32 may vary along the length of the light-diffusing optical fiber 40 or may be constant. Further, the concentration of the scattering agent 32 may be of a weight percent sufficient to provide even scattering of the light out of the fiber 40 while limiting overall attenuation. In some embodiments, the weight percentage of the scattering agents 32 in the outer cladding 30 comprises about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, or 50%. In some embodiments, the outer cladding 30 possesses small particles as scattering agents 32, which comprise metal oxides or other high refractive index material, such as $TiO_2$, ZnO, $SiO_2$, or Zr. The scattering material employed as scattering agents 32 may also comprise micro- or nano-sized particles or voids of low refractive index, such as gas bubbles.

In outer cladding 30, the outer scattering layer 36 generally extends from the outer radius of the inner layer 34 when inner layer 34 is present. Otherwise, outer scattering layer 36 generally extends from the outer radius, $R_2$, of the inner cladding 20 to its radius, $R_3$ (see FIG. 1C). In some embodiments described herein, the thickness of the outer scattering layer 36 is greater than about 1 µm, 2 µm, 3 µm, 4 µm, 5 µm, 6 µm, 7 µm, 8 µm, 9 µm, 10 µm, 20 µm, 30 µm, 40 µm, 50 µm, 60 µm, 70 µm, 80 µm, 90 µm, or 100 µm.

In some embodiments, the scattering agents 32 may contain scattering particles including, but not limited to, $TiO_2$-based particles, such as white ink, which provides for an angle independent distribution of light scattered from the core region 10 and inner cladding 20 of the light-diffusing optical fiber 40. In some embodiments, the scattering agents 32 are located within outer scattering layer 36 within outer cladding 30. For example, in some embodiments, outer scattering layer 36 may have a thickness of about 1 µm to about 5 µm. In other embodiments, the thickness of outer scattering layer 36 and/or the concentration of the scattering agents 32 in the outer scattering layer 36 may be varied along the axial length of the light-diffusing optical fiber 40 so as to provide more uniform variation in the intensity of light scattered from the fiber 40 at large angles (i.e., angles greater than about 15 degrees).

Referring to FIGS. 1A and 1B, light-diffusing optical fiber 40 efficiently scatters incident light 1 directed into one of its ends out through the core region 10, inner cladding 20 and outer cladding 30 as scattering light rays 4. In general, the relatively high levels of dopants in the core region 10 provide a scattering contribution that is associated with the localized compositional fluctuations from the dopants. Further, differences in viscosity between the glass compositions employed in the inner cladding 20 and the core region 10 lead to structural imperfections at the interface between the core region 10 and the inner cladding 20. These imperfections promote a small angle scattering ("SAS") contribution to the overall ability of the fiber 40 to scatter light along its length. In addition, the relatively high refractive index of the core region 10 also promotes scattering through Rayleigh scattering effects. Collectively, these light scattering contributions associated with light-diffusing optical fiber 40 are governed by Equation (1):

$$B = B_R + B_c + B_{SAS} \qquad (1)$$

where B is the overall scattering loss associated with light-diffusing optical fiber 40, $B_R$ is the Rayleigh scattering contribution, $B_c$ is the scattering contribution associated with compositional fluctuations in the core region 10 from the dopants, and $B_{SAS}$ is the small angle scattering contribution associated with viscosity differences between the glass compositions employed in the core region 10 and the inner cladding 20.

Rayleigh scattering in the core region 10 of the light-diffusing optical fiber 40 depends on both the fictive temperature of the glass and its composition. In particular, Equation (2) below provides the Rayleigh scattering contribution, $B_R$, associated with the core region 10 of the fiber 40:

$$B_R = 5 \times 10^{-5} n^8 p^2 T_g K_T \qquad (2)$$

where n is the refractive index, p is the stress-optical coefficient, $K_T$ is the isothermal compressivity, and $T_g$ is the glass transition temperature for the glass composition selected for the core region 10. As discussed earlier, the glass composition of the core region 10 is selected such that it possesses a relatively high refractive index, $n_1$, particularly in comparison to the refractive index of the inner cladding 20, $n_2$. The dopant levels in the core region 10 also contribute to the relatively high refractive index $n_1$. The relatively high refractive index $n_1$ in the core region 10 contributes to high Rayleigh scattering loss effects, as demonstrated by Equation (2).

In addition, the dopant levels in the core region 10 of the light-diffusing optical fiber 40 also provide a compositional-based scattering effect, $B_c$ as given by Equation (3) below:

$$B_c = 2.4 V n^2 (dn/dc)^2 c(1-c) \qquad (3)$$

where V is the molar fraction of the dopants in the core region 10, n is the refractive index in the core region 10, dn/dc is the refractive index change associated with a particular dopant in the core region 10 and c is the concentration of the dopant in the core region 10. For multiple dopants, e.g., $TiO_2$ and ZnO, the contributions associated with each dopant may be separately calculated and added to provide the $B_c$ scattering contribution. The effective scattering contribution associated with each dopant is particularly sensitive to its dn/dc value. As discussed earlier, effective dopants include oxides of Ge, P, Na, Pb, La, Zn, Al and others. Most of these dopants have very little impact on the absorption of incident light 1 in the wavelength range of 400-1700 nm within each light-diffusing optical fiber 40. Nevertheless, the processes used to introduce these dopants and the relatively high levels of these dopants in the core region 10 of fiber 40 (particularly as compared to core dopant levels in telecommunications optical fibers) can degrade the optical transmission of the fiber 40 due to absorption in the wavelength of interest. But at the relatively short application lengths associated with the intended applications for light-diffusing optical fiber 40, these absorption levels (~1 dB/m) are tolerated.

It is preferable to employ light-diffusing optical fibers 40 in the general length range of about 0.1 m to about 100 m, particularly in view of limited absorption losses associated with the dopants employed in the core region 10 at these lengths. In some embodiments described herein, the light-diffusing optical fiber 40 will generally have a length from about 100 m, 75 m, 50 m, 40 m, 30 m, 20 m, 10 m, 9 m, 8 m, 7 m, 6 m, 5 m, 4 m, 3 m, 2 m, 1 m, 0.75 m, 0.5 m, 0.25 m, 0.15 m, or 0.1 m.

The SAS contribution, $B_{SAS}$, is associated with viscosity differences between the glass compositions employed in the core region 10 and the inner cladding 20. In particular, the $B_{SAS}$ contribution originates from draw instabilities between the core region 10 and the inner cladding 20 during formation of the light-diffusing optical fiber 40 using a down-draw process. These instabilities lead to defects and other micro-deformations at the interface between the core region 10 and the inner cladding 20, providing a small angle scattering effect. The magnitude of $B_{SAS}$ can be as large as ~10-100% of the Rayleigh scattering contribution, $B_R$.

Advantageously, the light-diffusing optical fibers 40 described herein have a scattering-induced attenuation loss in the range of about 0.5 to about 5 dB/m (at wavelengths from 400 to 1700 nm). Such light-diffusing optical fibers 40 possess light scattering contributions as given by Equation (1), described earlier. For certain applications, it is preferable to tailor fibers 40 to possess a scattering-induced attenuation loss in the range of about 1 to about 2 dB/m. In other applications, it is preferable to tailor the attenuation loss of fibers 40 in the range of about 2 to about 5 dB/m.

As described herein, the light-diffusing optical fibers 40 can be constructed to produce uniform illumination along their entire length. In other embodiments, light-diffusing optical fibers 40 can be constructed to produce uniform illumination along a segment of the fiber which is less than the entire length of the fiber. The phrase "uniform illumination," as used herein, means that the intensity of light emitted from the light-diffusing fiber, e.g., optical fibers 40, does not vary by more than 25% over the specified length.

The light-diffusing optical fibers 40 described herein may be formed using various processing techniques. Generally, the fibers 40 are drawn from an optical fiber preform with a fiber take-up systems and exit the draw furnace along a substantially vertical pathway. In view of the $B_{SAS}$ contributions, it is preferable to select the glass compositions of the core region 10 and the inner cladding 20 such that they possess a mismatch in viscosities at a given draw temperature. In some embodiments, the glass compositions of the core region 10 and the inner cladding 20 of the light-diffusing optical fibers 40 are selected such that they possess an absolute viscosity mismatch, $\Delta \eta$, in the range of about 1 to about 10 poise at the draw temperature selected for fiber processing. That is, $\Delta \eta = |\eta_{core} - \eta_{clad}| = \sim 1$ to 10 poise, where $\eta_{core}$ and $\eta_{clad}$ are the viscosities of the glass compositions of the core region 10 and the inner cladding 20, respectively, at a given draw temperature.

After the light-diffusing optical fibers 40 exit the draw furnace, the fibers 40 can be coated such that one or more polymeric layers are applied to form the outer cladding 30. In some embodiments, scattering agents 32 can be employed in the outer scattering layer 36 of the outer cladding 30.

Figure 2:
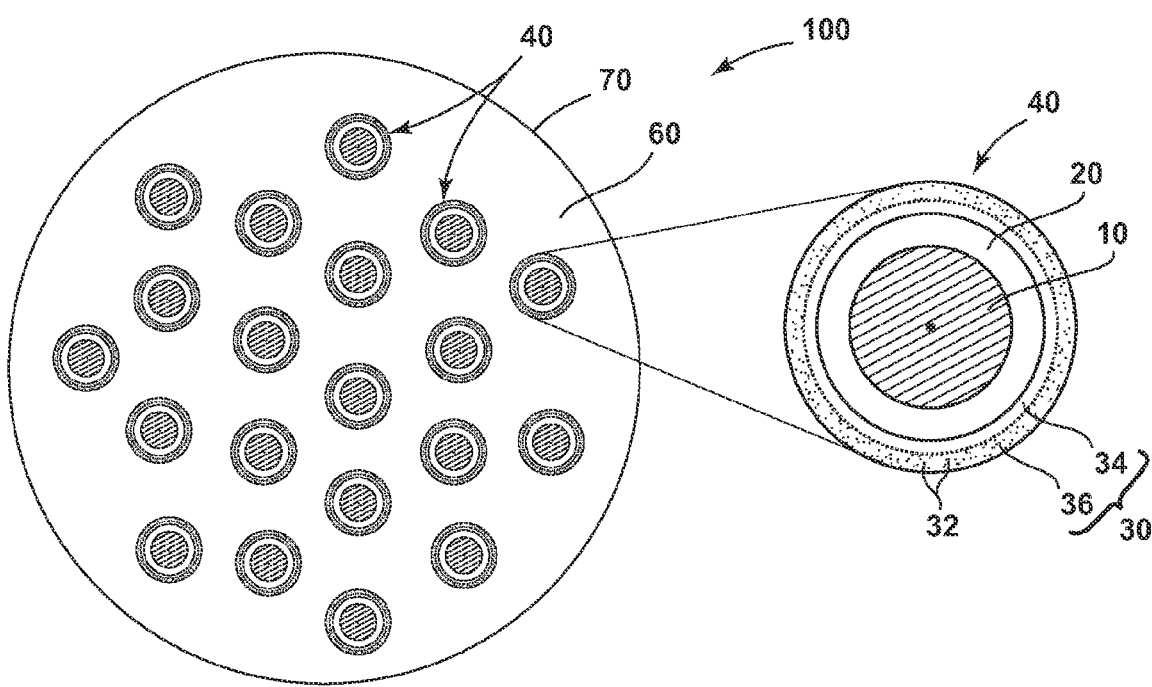
FIG. 2 is a schematic cross-sectional view of an exemplary embodiment of a light-diffusing optical fiber bundle.

Referring to FIG. 2, one embodiment of a light-diffusing optical fiber bundle 100 is depicted. The light-diffusing optical fiber bundle 100 includes a jacket 70 that comprises a substantially transparent material. Optical fiber bundle 100 further includes a plurality of light-diffusing optical fibers 40 arranged within the jacket 70. Each optical fiber 40 includes: a core region 10 that comprises a core glass composition, and an inner cladding 20 that surrounds the core region 10 and comprises a cladding glass composition that substantially differs from the core glass composition. Further, each optical fiber 40 includes an outer cladding 30 that surrounds the inner cladding 20 and comprises a fluorinated polymer or non-fluorinated composition and a plurality of scattering elements 32. The core glass composition of each optical fiber comprises a doped, low-melting point silica glass having less than 90% by weight $SiO_2$, and the numerical aperture, NA, of each fiber 40 is greater than or equal to 0.4. In addition, a filler 60 comprising a substantially transparent material is located between the jacket 70 and the light-diffusing optical fibers 40.

It should be understood that any of the various embodiments of light-diffusing optical fibers 40 described earlier in connection with FIGS. 1A-1D can be employed within the light-diffusing optical fiber bundle 100 depicted in FIG. 2. The operation of the light-diffusing optical fiber bundle 100 is substantially consistent with the operation of a single light-diffusing optical fiber 40 (see FIG. 1A). That is, incident light 1 is directed into one of the ends of the bundle 100, and thereby into one of the ends of each fiber 40 contained in the bundle 100 (not shown). Incident light 1 travels within each fiber 40 and out through the core region 10, inner cladding 20 and outer cladding 30 as scattering light rays 4. Each light-diffusing optical fiber 40 provides light scattering along its length, e.g., as governed by Equation (1), and uniform angular scattering by virtue of its outer cladding 30 containing scattering agents 32. These scattering light rays 4 then continue into the substantially transparent filler 60 and out of the fiber bundle 100 through the jacket 70 (not shown).

The distribution and concentration of light-diffusing optical fibers 40 within each bundle 100 can be selected for particular lighting applications in view of various considerations, including the dimensional requirements of the application, the amount of light needed for the application as a function of the length of the bundle 100, etc. It is also possible to utilize multiple configurations of light-diffusing optical fibers 40 (e.g., a combination of optical fibers 40 with varying scattering attenuation loss levels) within a given bundle 100 for particular applications.

Figure 3:
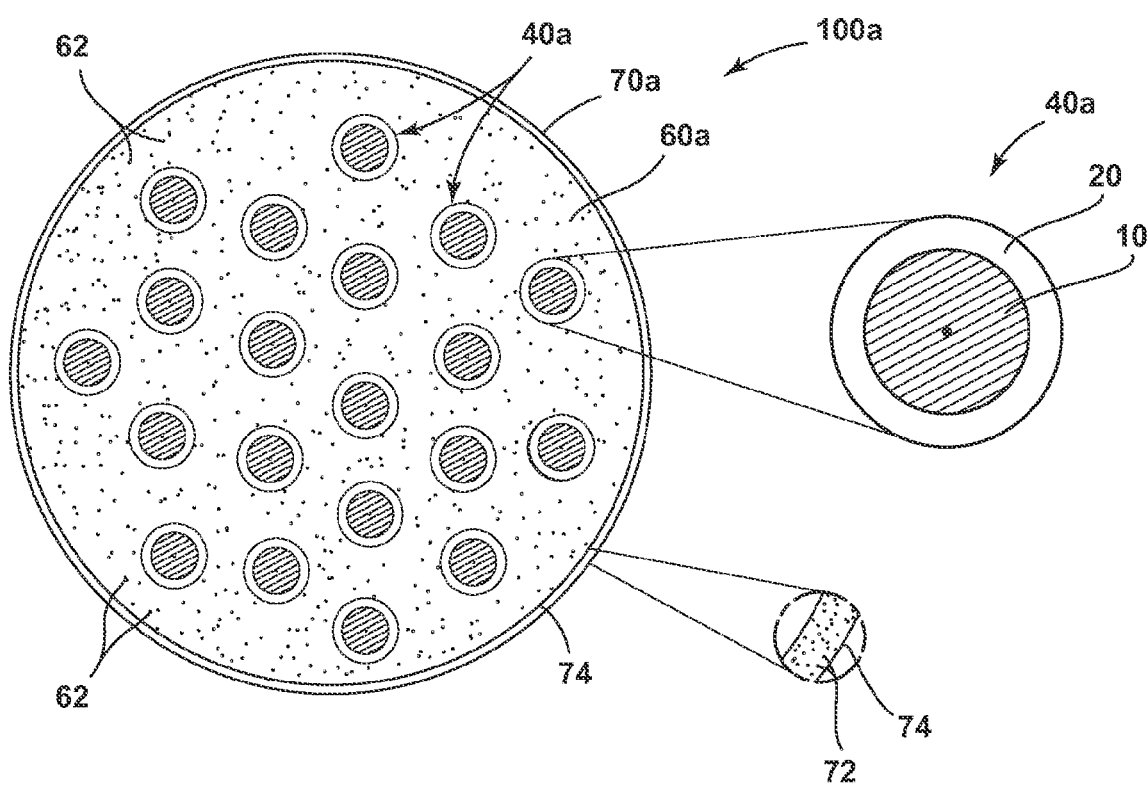
FIG. 3 is a schematic cross-sectional view of another exemplary embodiment of a light-diffusing optical fiber bundle.

Referring to FIG. 3, another embodiment of a light-diffusing optical fiber bundle 100a is depicted. The light-diffusing optical fiber bundle 100a includes a jacket 70a that comprises a scattering element. The bundle 100a further includes a plurality of optical fibers 40a arranged within the jacket 70a. The scattering element includes the scattering filler 60a and the scattering layer 74 in the outermost portion of the jacket 70a. Filler 60a is located between the jacket 70a and the light-diffusing optical fibers 40a. Scattering elements 62 and 72 are located in the scattering filler 60a and scattering layer 74, respectively. It is preferable to utilize $TiO_2$ particles and/or other scattering particles for scattering elements 62 and 72, consistent with the scattering agents 32 described earlier in connection with embodiments of light-diffusing optical fibers 40.

Each light-diffusing optical fiber 40a within the bundle 100a includes: a core region 10 that comprises a core glass composition, and an inner cladding 20 that surrounds the core region 10 and comprises a cladding glass composition that substantially differs from the core glass composition. The core glass composition of each optical fiber 40a comprises a doped, low-melting point silica glass having less than 90% by weight $SiO_2$, and the numerical aperture, NA, of each fiber 40a is greater than or equal to 0.4.

It should be understood that any of the various embodiments of light-diffusing optical fibers 40 described earlier in connection with FIGS. 1A-1D can be employed within light-diffusing optical fiber bundle 100a depicted in FIG. 3, provided that these fibers 40 are modified such that they do not possess an outer cladding 30 (i.e., consistent with the light-diffusing optical fibers 40a). The operation of the light-diffusing optical fiber bundle 100a is substantially consistent with the operation of a single light-diffusing optical fiber 40 (see FIG. 1A). That is, incident light 1 is directed into directed into one of the ends of the bundle 100a, and thereby into one of the ends of each fiber 40a contained in the bundle 100a (not shown). Incident light 1 travels within each fiber 40a and out through the core region 10 and inner cladding 20 as scattering light rays 4. Each light-diffusing optical fiber 40a provides light scattering along its length, e.g., as governed by Equation (1). Further, uniform angular scattering is provided by the light-diffusing optical fiber bundle 100a by virtue of its scattering elements, i.e., scattering agents 62 and 72 contained in the filler 60a and/or jacket 70a. As such, incident light rays 1 continue out of each light-diffusing optical fiber 40a, out through the filler 60a and jacket 70a, and then exit the bundle 100a as scattering rays 4 (not shown).

The distribution and concentration of optical fibers 40a within each bundle 100a can be selected for particular lighting applications in view of numerous considerations, including the dimensional requirements of the application, the amount of light needed for the application as a function of the length of the bundle 100a, etc. It is also possible to utilize multiple configurations of light-diffusing optical fibers 40a (e.g., a combination of optical fibers 40a with varying scattering attenuation loss levels) within a given bundle 100a for particular applications.

It will be apparent to those skilled in the art that various modifications and variations can be made without departing from the spirit or scope of the claims.

What is claimed is:

1. A light-diffusing optical fiber, comprising:
   a core region in the fiber that comprises a core glass composition; and
   an inner cladding in the fiber that surrounds the core region and comprises a cladding glass composition that substantially differs from the core glass composition,
   wherein the core glass composition comprises a doped-silica glass having less than 90% by weight $SiO_2$, and the numerical aperture of the fiber is greater than or equal to 0.4, wherein the fiber exhibits light scattering of at least 0.5 dB/m, wherein the fiber is fabricated using a down-draw process at a drawing temperature, and further wherein the core and the cladding glass composition are selected such that an absolute viscosity mismatch of 1 to 10 poise exists between the core and the cladding glass composition at the drawing temperature.

2. The light-diffusing optical fiber according to claim 1 wherein the core glass composition is selected from the group consisting of soda-lime silicate glass, alkali borosilicate glass and aluminosilicate glass.

3. The light-diffusing optical fiber according to claim 1, wherein the fiber exhibits light scattering from 0.5 to 5 dB/m.

4. The light-diffusing optical fiber according to claim 1, wherein the fiber is fabricated using a down-draw process and the doped silica glass is doped during the down-draw process with a dopant in a gaseous form or a melt form.

5. The light-diffusing optical fiber according to claim 1, further comprising:
   an outer cladding in the fiber that surrounds the inner cladding and comprises a polymer composition.

6. The light-diffusing optical fiber according to claim 5, wherein the outer cladding further comprises an inner layer and an outer scattering layer doped with scattering particles.

7. The light-diffusing optical fiber according to claim 5, wherein the outer cladding is a scattering layer doped with scattering particles.

8. A light-diffusing optical fiber bundle, comprising:
a jacket comprising a body including a scattering element; and
a plurality of optical fibers arranged within the jacket, said jacket body enclosing said fibers
wherein at least one of said optical fibers is the light-diffusing optical fiber according to claim 1.

9. The light-diffusing optical fiber bundle according to claim 8, wherein the core glass composition of said light-diffusing optical fiber is selected from the group consisting of soda-lime silicate glass, alkali borosilicate glass and aluminosilicate glass.

10. The light-diffusing optical fiber bundle according to claim 8, wherein the fiber bundle exhibits light scattering from 0.5 to 5 dB/m.

11. A light-diffusing optical fiber bundle, comprising:
a jacket comprising a scattering element; and
a plurality of optical fibers arranged within the jacket, wherein each optical fiber comprises:
(a) a core region that comprises a core glass composition, and
(b) an inner cladding that surrounds the core region and comprises a cladding glass composition that substantially differs from the core glass composition, and
further wherein the core glass composition of each optical fiber comprises a doped, silica glass having less than 90% by weight $SiO_2$, and the numerical aperture of the fiber is greater than or equal to 0.4, and wherein the fiber bundle exhibits light scattering of at least 0.5 dB/m, wherein each optical fiber is fabricated using a down-draw process at a drawing temperature, and further wherein the core and the cladding glass composition are selected such that an absolute viscosity mismatch of 1 to 10 poise exists between the core and the cladding glass composition at the drawing temperature.

12. A light-diffusing optical fiber bundle, comprising:
a jacket comprising a scattering element; and
a plurality of optical fibers arranged within the jacket, wherein each optical fiber comprises:
(a) a core region that comprises a core glass composition, and
(b) an inner cladding that surrounds the core region and comprises a cladding glass composition that substantially differs from the core glass composition, and
further wherein the core glass composition of each optical fiber comprises a doped, silica glass having less than 90% by weight $SiO_2$, and the numerical aperture of the fiber is greater than or equal to 0.4, and wherein the fiber bundle exhibits light scattering of at least 0.5 dB/m, wherein each optical fiber is fabricated using a down-draw process and the doped silica glass is doped during the down-draw process with a dopant in a gaseous form or a melt form.

13. A light-diffusing optical fiber bundle, comprising:
a jacket comprising a scattering element; and
a plurality of optical fibers arranged within the jacket, wherein each optical fiber comprises:
(a) a core region that comprises a core glass composition, and
(b) an inner cladding that surrounds the core region and comprises a cladding glass composition that substantially differs from the core glass composition, and
further wherein the core glass composition of each optical fiber comprises silica glass having less than 90% by weight $SiO_2$, and
the numerical aperture of the fiber is greater than or equal to 0.4, and the scattering element is a scattering filler arranged between the plurality of optical fibers within the jacket.

14. The light-diffusing optical fiber bundle according to claim 13, wherein the scattering filler is doped with scattering particles.

15. A light-diffusing optical fiber bundle, comprising:
a transparent jacket; and
a plurality of optical fibers arranged within the jacket, wherein each optical fiber comprises:
(a) a core region that comprises a core glass composition,
(b) an inner cladding that surrounds the core region and comprises a cladding glass composition that substantially differs from the core glass composition, and
(c) an outer cladding in the fiber that surrounds the inner cladding and comprises a polymer composition and a plurality of scattering elements, and
further wherein the core glass composition of each optical fiber comprises a doped silica glass having less than 90% by weight $SiO_2$, and the numerical aperture of the fiber is greater than or equal to 0.4, and wherein the fiber bundle exhibits light scattering of at least 0.5 dB/m, wherein each optical fiber is fabricated using a down-draw process and the doped silica glass of said core glass composition is doped during the down-draw process with a dopant in a gaseous form or a melt form and the core glass composition is selected from the group consisting of soda-lime silicate glass, alkali borosilicate glass and aluminosilicate glass.

16. The light-diffusing optical fiber bundle according to claim 15, wherein the fiber bundle exhibits light scattering from 0.5 to 5 dB/m.

17. A light-diffusing optical fiber bundle, comprising:
a transparent jacket; and
a plurality of optical fibers arranged within the jacket, wherein each optical fiber comprises:
(a) a core region that comprises a core glass composition,
(b) an inner cladding that surrounds the core region and comprises a cladding glass composition that substantially differs from the core glass composition, and
(c) an outer cladding in the fiber that surrounds the inner cladding and comprises a polymer composition and a plurality of scattering elements, and
further wherein the core glass composition of each optical fiber comprises a doped silica glass having less than 90% by weight $SiO_7$, and the numerical aperture of the fiber is greater than or equal to 0.4, and wherein the fiber bundle exhibits light scattering of at least 0.5 dB/m, wherein each optical fiber is fabricated using a down-draw process at a drawing temperature, and further wherein the core and the cladding glass composition are selected such that an absolute viscosity mismatch of 1 to 10 poise exists between the core and the cladding glass composition at the drawing temperature.

18. A light-diffusing optical fiber bundle, comprising:
a transparent jacket; and
a plurality of optical fibers arranged within the jacket, wherein each optical fiber comprises:
(a) a core region that comprises a core glass composition, (b) an inner cladding that surrounds the core region and comprises a cladding glass composition that substantially differs from the core glass composition, and
(c) an outer cladding in the fiber that surrounds the inner cladding and comprises a polymer composition and a plurality of scattering elements, and further wherein the core glass composition of each optical fiber comprises a doped silica glass having less than 90% by weight $SiO_2$, and the numerical aperture of the fiber is greater than or equal to 0.4, and wherein the fiber bundle exhibits light scattering of at least 0.5 dB/m, wherein each optical fiber is fabricated using a down-draw process and the doped silica glass of said core glass composition is doped during the down-draw process with a dopant in a gaseous form or a melt form.

* * * * *